United States Patent [19]
Wildt

[11] Patent Number: 4,627,137
[45] Date of Patent: Dec. 9, 1986

[54] DEVICE FOR TREATING NONWOVENS

[75] Inventor: Eberhard Wildt, Grenzach-Wyhlen, Fed. Rep. of Germany

[73] Assignee: Robert Casaretto KG, Grenzach-Wyhlen, Fed. Rep. of Germany

[21] Appl. No.: 630,443

[22] Filed: Jul. 13, 1984

[30] Foreign Application Priority Data

Jul. 21, 1983 [DE] Fed. Rep. of Germany ....... 3326281

[51] Int. Cl.⁴ ............................................. B32B 31/20
[52] U.S. Cl. ................................. 29/121.2; 29/121.4; 29/121.5
[58] Field of Search .................. 29/110, 116 R, 121.1, 29/121.2, 121.4, 121.5, 121.6, 121.7; 156/645; 198/688, 780

[56] References Cited
U.S. PATENT DOCUMENTS

| | | | |
|---|---|---|---|
| 1,305,330 | 6/1919 | Wolever et al. | 29/121.2 |
| 2,839,785 | 6/1958 | Stevens | 29/121.2 X |
| 3,114,312 | 12/1963 | Laue | 29/121.2 X |
| 4,110,152 | 8/1978 | Dunning et al. | 29/121.2 X |

*Primary Examiner*—Howard N. Goldberg
*Assistant Examiner*—Timothy V. Eley
*Attorney, Agent, or Firm*—Peter K. Kontler

[57] ABSTRACT

A roller for heat- and/or solvent-treatment of fibrous materials has circumferentially extending annuli or spirally arranged rows of coherent or discrete neighboring protrusions each of which has a larger frustopyramidal section nearer to and a smaller frustopyramidal section more distant from the peripheral surface of the cylindrical body of the roller. The taper of facets of the smaller frustopyramidal sections is less pronounced than the taper of the facets of the larger sections, and the distance between the bases of two neighboring larger sections is less than half the height of a protrusion. The top lands of the smaller sections are relatively large and, due to the less pronounced taper of the facets of such smaller sections, the top lands can be reground a large number of times without unduly increasing their areas so that the rate of transfer of heat from the cylindrical body to the top lands and thence to the adjacent fibers is not unduly affected by repeated grinding. The heights of the smaller sections is less than the height of the larger sections. This also promotes satisfactory transfer of heat from the cylindrical body, through the larger sections and to the top lands of the respective smaller sections.

16 Claims, 2 Drawing Figures

DEVICE FOR TREATING NONWOVENS

BACKGROUND OF THE INVENTION

The present invention relates to rollers or analogous devices for the treatment of fibrous materials with the application of heat and/or solvents. More particularly, the invention relates to improvements in rotary devices which can be used to reinforce or strengthen selected portions of layers, webs, sheets or panels of nonwoven fibrous material as a result of controlled and oriented application of heat and/or suitable solvents.

It is already known to heat-treat or solvent-treat layers of fibrous material with rollers of the type having protrusions which extend outwardly from the peripheral surface of a cylindrical body. The protrusions may be in the form of ribs or in the form of discrete protuberances of relatively small width and length, as considered in the circumferential and axial directions of the cylindrical body. It is also known to impart to the protrusions a substantially frustoconical configuration so that the protrusions taper in directions away from the peripheral surface of the cylindrical body. In other words, the cross-sectional area of the base of each protrusion in the region of the peripheral surface is larger than the cross-sectional areas which are more distant from the peripheral surface. Rollers of the above outlined character are often used to enhance the absorbency of layers of fibrous material which can be used as absorbent pieces of textile material or the like. As a rule, the taper of such protrusions is quite pronounced so that each protrusion resembles a strongly tapering pyramid or a similar geometric body. This is intended to reduce the likelihood of development of undercuts during the engraving of a cylindrical body for the purpose of making protrusions thereon. However, such formation of protrusions also brings about serious drawbacks, for example, because the fibers are likely to be bonded to each other in those regions which are adjacent to the facets or flanks of the protrusions, i.e., not only in the regions of the tips or outermost portions of such protrusions. Moreover, the useful life of such conventional rollers is relatively short because the protrusions cannot be ground a large number of times since each grinding entails a pronounced increase in the areas of top lands of the protrusions with attendant much more pronounced transfer of heat between the tips of the protrusions and the adjacent fibers. Still further, repeated grinding of the protrusions entails a pronounced reduction of the volume of the grooves between neighboring protrusions so that such grooves can accommodate a smaller number of fibers when the rollers of the just described conventional character are in actual use.

OBJECTS AND SUMMARY OF THE INVENTION

An object of the invention is to provide a novel and improved device for heat- and/or solvent-treatment of nonwovens or the like which can stand much longer periods of use than all heretofore known devices of such character.

Another object of the invention is to provide a device which can be repeatedly ground or subjected to an analogous material-removing treatment without unduly affecting its action upon a fibrous material.

A further object of the invention is to provide a rotary roller-shaped device which can be used in existing textile machines as a superior substitute for heretofore a highly desirable directed flow of heat energy to selected portions of treated material.

An additional object of the invention is to provide a device whose protrusions are configurated, dimensioned and distributed in a novel and improved way.

Another object of the invention is to provide a device wherein the likelihood of excessive heating of those portions of a nonwoven textile material which do not require, or which should not be subjected to, intensive heating is much less pronounced than in heretofore known reinforcing devices for nonwovens or the like.

An ancillary object of the invention is to provide a textile material which has undergone a treatment with a device of the above outlined character.

Another object of the invention is to provide a novel and improved method of transmitting heat to selected portions of textile materials.

The invention resides in the provision of a device for heat- and/or solvent-treatment of fibers in nonwovens or the like. The improved device comprises a rotary body having a substantially cylindrical peripheral surface and a plurality of neighboring protrusions in the form of nobs or analogous protuberances which extend outwardly beyond the peripheral surface of the rotary body. Each protrusion includes an outer or first section which is more distant from the peripheral surface of the rotary body and has a top land in the form of a platform or the like, and a second section between the peripheral surface and the first section. The first sections of the protrusions have first facets each of which makes with the respective top land a first acute angle, and the second sections of the protrusions have second facets each of which makes with the respective top land a second acute angle which is smaller than the first acute angle. Each protrusion can have a substantially rectangular, square or rhomboidal outline. The first angle can be between 20° and 90°, preferably between 80° and 88°, and most preferably about 86°. The second angle can be between 45° and 75°, preferably approximately 60°.

The height of the first sections, as measured radially of the rotary body, need not exceed and can be less than the height of the respective second sections. The presently preferred ratio of the heights of first and second sections of each protrusion is approximately three-to-five.

The distance between the second sections of two neighboring protrusions in the region of the peripheral surface of the rotary body need not exceed half the distance between the top lands of such neighboring protrusions.

The distance between the second sections of two neighboring protrusions in the region of the peripheral surface of the rotary body need not exceed half the height of a protrusion, as measured radially of the rotary body.

The distance between those portions of the first sections of two neighboring protrusions which are nearest to the respective second sections at least equals the width of such portions of first sections, as measured in the circumferential direction of the rotary body.

The protrusions can form annuli which extend circumferentially of the rotary body or spirals which extend around the rotary body.

Each section of each protrusion can resemble the frustum of a cone or a pyramid, each protrusion can have more than two sections, and the taper of each section which is nearer to the peripheral surface of the rotary body is more pronounced than the taper of each section which is outwardly adjacent thereto.

The novel features which are considered as characteristic of the invention are set forth in particular in the appended claims. The improved device itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
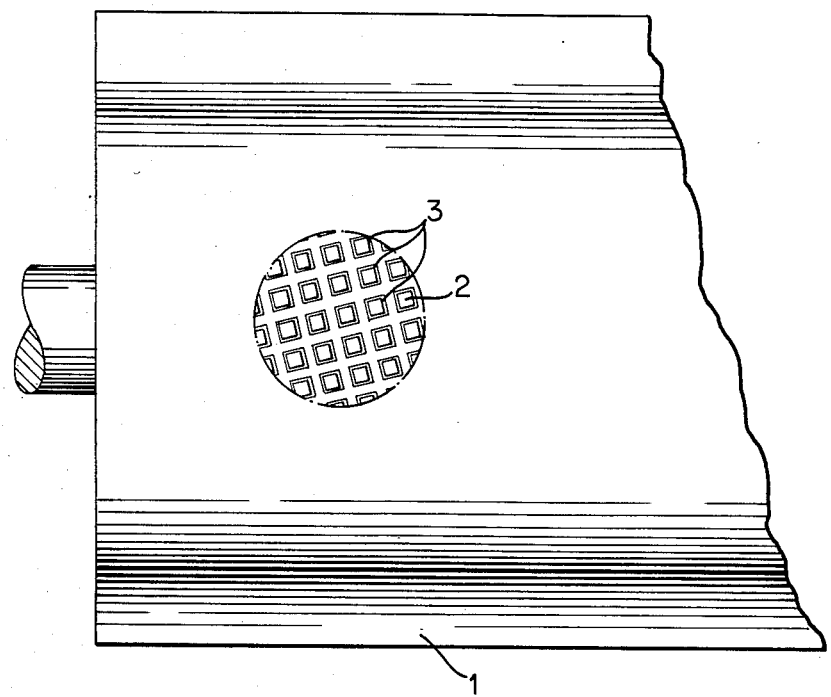
FIG. 1 is a fragmentary elevational view of a device which embodies one form of the invention.

The device which is shown in FIG. 1 is a roller which comprises a rotary cylindrical body 1 having a peripheral surface 1a (see FIG. 2) and provided with several circumferentially extending annuli or spirally arranged rows of protrusions 3 in the form of twin pyramidal frusta each of which has a flat or substantially flat top land 2. Each protrusion 3 includes several sections including a first or outer section 3a which is immediately adjacent to the respective top land 2 and a second or inner section 3b which is disposed between the first section 3a and the peripheral surface 1a of the cylindrical body 1. The illustrated device cooperates with a similar or identical device for reinforcement of fibers as a result of the application of heat and/or solvents in a manner not forming part of the present invention. The protrusions 3 can serve to weld the adjacent portions of fibers as a result of transfer of heat from the top lands 2 into the material which is adjacent thereto.

Each first section 3a is flanked by four facets 4a and each such facet makes with the respective top land 2 a relatively large acute angle 90° minus alpha. The reference character E denotes a plane which extends substantially radially of the body 1, i.e., substantially at right angles to the planes of the adjacent portion of the peripheral surface 1a and of the corresponding top land 2, and the facet 4a which is immediately adjacent to such plane makes therewith an angle alpha. The angle between a facet 4a and the respective top land 2 can be between 20° and 90° and preferably between 80° and 88°, most preferably approximately 86°. The acute angles (90° minus beta) between the facets 4b of the second sections 3b and the respective top lands 2 are smaller than the angles 90° minus alpha. For example, the angle beta between each facet 4b and the adjacent plane E can be in the range of between 15° and 45°, preferably approximately 30° (i.e., the angle 75° minus beta is between 45° and 90°), preferably approximately 60°. It will be noted that each of the sections 3a and 3b constitutes the frustum of a pyramid. The reference character 5 denotes in FIG. 2 the region where the respective second section 3b merges into the cylindrical body 1 of the improved device.

The just described configuration of the protrusions 3 ensures highly satisfactory and accurately oriented transfer of heat from the body 1 to the top lands 2 of the first sections 3a and thence into the adjacent fibrous material. Moreover, such configuration of protrusions 3 contributes to their stability, especially to pronounced resistance to the action of transverse forces, e.g., forces acting tangentially or circumferentially of the cylindrical body 1.

Each of the protrusions 3 preferably exhibits a polygonal (particularly square, rectangular or rhomboidal) outline. The aforementioned selection of angles 90° minus alpha and 90° minus beta exhibits the advantage that the protrusions 3 can be readily formed in available machines, e.g., in suitable engraving machines. Selection of relatively large angles 90° minus alpha (i.e., of relatively small acute angles alpha) is desirable and advantageous on the additional ground that the taper of the first sections 3a in directions from the respective second sections 3b toward the respective top lands 2 is not very pronounced; this is desirable because the area of top lands 2 does not increase appreciably, even in response to repeated grinding, so that the rate of heat transfer from the top lands 2 into the adjacent material does not increase abruptly or noticeably after each grinding operation.

Figure 2:
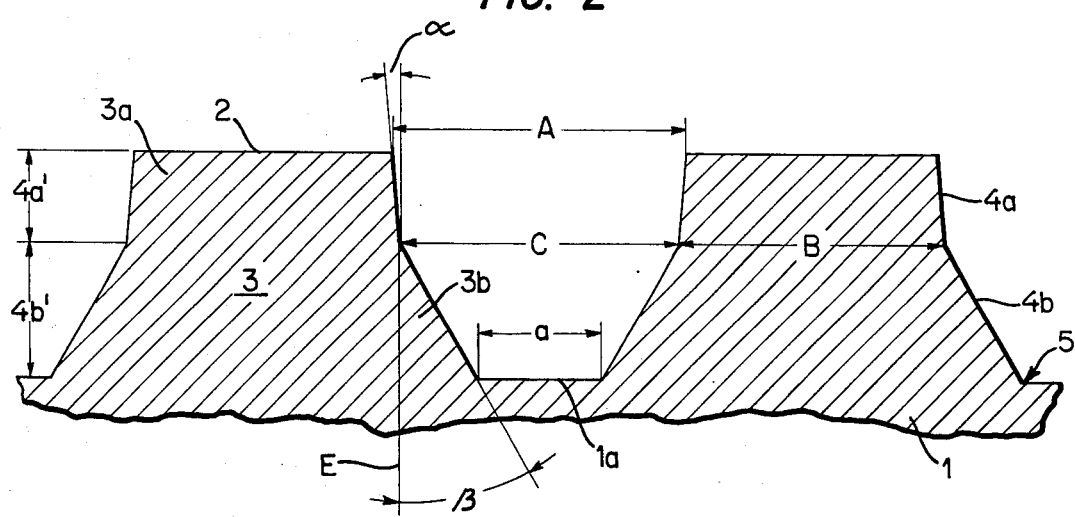
FIG. 2 is an enlarged sectional view of two neighboring protrusions and of the adjacent portion of the cylindrical body of the device which is shown in FIG. 1.

FIG. 2 shows that the height 4a' of the first sections 3a (as measured radially of the body 1) at most equals but is preferably somewhat less than the height (4b') of the respective second sections 3b. For example, a presently preferred ratio of the heights 4a' to 4b' is approximately three-to-five. Such dimensioning of the sections 3a and 3b contributes stability and more satisfactory thermal conductivity of the protrusions 3.

The distance a between the bases 5 of two neighboring protrusions 3 is much less (preferably less than one-half) than the distance A between the respective top lands 2. The distance a can approximate but can be at least slightly less than half the height of a protrusion 3, as measured radially of the body 1.

The distance C between those portions of the first sections 3a of two neighboring protrusions 3 which are nearest to the respective second sections 3b preferably equals, approximates or slightly exceeds the width B of the adjacent radially innermost portions of first sections 3a, as measured circumferentially of the body 1 (it is assumed that the protrusions 3 shown in FIG. 2 form part of an annulus of protrusions which extend substantially circumferentially of the body 1). Such dimensioning of the channels or grooves between the neighboring protrusions 3 contributes to a harmonic configuration of the channels and provides ample room for the filaments to enter between neighboring protrusions to thus avoid welding of fibers (or to reduce to a minimum the welding of fibers) in locations where the fibers should remain unattached to each other. This also allows for predictable and rapid separation of the improved device from the treated material.

It has been found that the improved device can be subjected to a surprisingly large number of consecutive grinding operations without unduly altering the transfer of heat between the protrusions 3 and the material which requires treatment. This is due to the aforediscussed feature that the angles 90° minus alpha are larger than the angles 90° minus beta, i.e., that the taper of second sections 3b in directions from the peripheral surface 1a toward the respective top lands 2 is more pronounced than the taper of the first sections 3a.

The improved device accomplishes several apparently contradictory objects, namely it can be ground again and again without adversely affecting the transfer of heat from the top lands 2 to the adjacent fibrous material. This is due to the fact that the inclination of facets 4a bounding the smaller outer sections 3a with reference to the respective top lands 2 is more pronounced than the inclination of the facets 4b of the larger second sections 3b. Consequently, the area of the top lands 2 does not change appreciably in response to repeated grinding or an analogous material removing treatment, and the relatively large sections 3b ensure highly satisfactory transfer of heat from the rotary body 1 to the sections 3a. Moreover, the relatively large and sturdy sections 3b enhance the stability of the protrusions 3 which is especially desirable in the course of a grinding operation because the grinding tool is less likely to break or otherwise separate the protrusions from the rotary body 1 of the improved device. As also mentioned above, the facets 4a (whose inclination with reference to the respective top lands 2 is quite pronounced and can be close to 90°) exhibit the advantage that they are less likely to transfer heat to adjacent fibers which would entail bonding in regions where the bonding is not required or is outright damaging to the ultimate product. This holds true even if the fibrous material which is being treated by the improved device is relatively thick. All in all, the useful life of the improved device is much longer than that of heretofore known devices which are used for analogous purposes. This is important because the engraving of protrusions 3 is a costly procedure.

If the improved device is used in conjunction with a second roller-shaped device, the two devices are mounted in such a way that their axes are parallel to one another. The helices which are formed by the protrusions of one device cross the helices which are formed by the protrusions of the other device so that they subject a fibrous material therebetween to a spot welding action. Moreover, the protrusions can constitute circumferentially extending ribs or spirals with circumferentially or helically extending channels or grooves therebetween. In the illustrated embodiment, the discrete protrusions form several helically arranged rows with one set of rows intersecting the other set of rows. This can be readily seen in FIG. 1.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. a device for heat- and/or solvent-treatment of fibers in nonwovens or the like, comprising a rotary body having a substantially cylindrical peripheral surface, and a plurality of neighboring protrusions extending outwardly beyond said peripheral surface, each of said protrusions including a first section having a top land, and a second section between said surface and said first section, said first sections having first facets each making with the respective top land a first acute angle, and said second sections having second facets each making with the respective top land a second acute angle which is smaller than the first acute angle, each of said first angles being greater than about 20°.

2. The device of claim 1, wherein each of said protrusions has a substantially rectangular or rhomboidal outline.

3. The device of claim 1, wherein each of said second angles is between 45° and 75°.

4. The device of claim 3, wherein each of said second angles is approximately 60°.

5. The device of claim 1, wherein the height of said first sections, as measured radially of said body, at most equals the height of the respective second sections.

6. The device of claim 5, wherein the ratio of heights of the first and second sections of each of said protrusions at least approximates 3:5.

7. The device of claim 1, wherein the distance between the second sections of two neighboring protrusions in the region of said peripheral surface at most equals half the distance between the top lands of such neighboring protrusions.

8. The device of claim 1, wherein the distance between the second sections of two neighboring protrusions in the region of said peripheral surface at most equals half the height of a protrusion, as measured radially of said body.

9. The device of claim 1, wherein the distance between those portions of the first sections of two neighboring protrusions which are nearest to the respective second sections at least equals the width of such portions of said first sections, as measured in the circumferential direction of said body.

10. The device of claim 1, wherein said protrusions form annuli extending circumferentially of said body.

11. The device of claim 1, wherein said protrusions form spirals around said body.

12. The device of claim 1, wherein at least one section of each protrusion constitutes the frustum of a pyramid.

13. The device of claim 1, wherein the number of sections in each protrusion exceeds two.

14. The device of claim 1, wherein the second sections of neighboring protrusions are spaced from one another at said peripheral surface.

15. The device of claim 1, wherein each of said first angles is between 80° and 88°.

16. The device of claim 15, wherein each of said first angles is 86°.

* * * * *